United States Patent
de Vos et al.

(10) Patent No.: US 11,500,834 B2
(45) Date of Patent: Nov. 15, 2022

(54) SYSTEMS AND METHODS FOR MIGRATING DATA

(71) Applicants: Atlassian Pty Ltd., Sydney (AU); Atlassian Inc., San Francisco, CA (US)

(72) Inventors: David de Vos, Melrose Park (AU); Eduardo Sebastian Esponda, Schofields (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 62 days.

(21) Appl. No.: 17/025,904

(22) Filed: Sep. 18, 2020

(65) Prior Publication Data

US 2022/0092039 A1 Mar. 24, 2022

(51) Int. Cl.
*G06F 16/00* (2019.01)
*G06F 16/21* (2019.01)
*G06F 16/23* (2019.01)

(52) U.S. Cl.
CPC .......... *G06F 16/214* (2019.01); *G06F 16/219* (2019.01); *G06F 16/2358* (2019.01)

(58) Field of Classification Search
CPC ... G06F 16/214; G06F 16/219; G06F 16/2358
See application file for complete search history.

(56) References Cited

U.S. PATENT DOCUMENTS

| | | | | |
|---|---|---|---|---|
| 9,990,389 | B1* | 6/2018 | Zenger | G06F 16/235 |
| 2006/0026168 | A1* | 2/2006 | Bosworth | H04L 67/1095 |
| 2008/0010243 | A1* | 1/2008 | Weissman | G06F 16/21 |
| 2014/0236649 | A1* | 8/2014 | Hamid | G06Q 10/103 |
| | | | | 705/7.11 |
| 2018/0293320 | A1* | 10/2018 | Melik | G06F 16/335 |
| 2019/0102418 | A1* | 4/2019 | Vasudevan | G06F 16/2358 |
| 2019/0294489 | A1* | 9/2019 | Aloysious | G06F 11/0772 |
| 2020/0042623 | A1* | 2/2020 | Barnes | G06F 16/214 |

* cited by examiner

*Primary Examiner* — Shiow-Jy Fan
(74) *Attorney, Agent, or Firm* — Brownstein Hyatt Farber Schreck, LLLP

(57) ABSTRACT

Described herein is a computer implemented method. A change event record of a change history dataset is processed by determining if the change event record matches any field matching records. The change event record matches a particular field matching record if it is determined that a change event record field identifier matches a field identifier of the particular field matching record and a new value associated with the change event record matches a comparison variable of the particular field matching record. In response to determining that the change event record matches a single field matching record, the change event record is associated with a unique field identifier of the single field matching record in a data store.

20 Claims, 5 Drawing Sheets

Activity 520

All    Comments    Work Log    History    Activity

● <u>Admin</u> created issue –   09/Sep/19 2:30 PM

522A

● <u>Admin</u> made changes –   09/Sep/19 2:31 PM

| Field | Original Value | New Value |
|---|---|---|
| TextCF | | 0 |

522B

● <u>Admin</u> made changes –   09/Sep/19 2:32 PM

| Field | Original Value | New Value |
|---|---|---|
| TextCF | | - |

522C

● <u>Admin</u> made changes –   09/Sep/19 2:33 PM

| Field | Original Value | New Value |
|---|---|---|
| TextCF | - | Common |

522D

● <u>Admin</u> made changes –   09/Sep/19 2:34 PM

| Field | Original Value | New Value |
|---|---|---|
| TextCF | 0 | Common |

522E

● <u>Admin</u> made changes –   09/Sep/19 2:35 PM

| Field | Original Value | New Value |
|---|---|---|
| TextCF | Common | A |

522F

● <u>Admin</u> made changes –   09/Sep/19 2:36 PM

| Field | Original Value | New Value |
|---|---|---|
| TextCF | Common | 1 |

522G

● <u>Admin</u> made changes –   09/Sep/19 2:37 PM

| Field | Original Value | New Value |
|---|---|---|
| TextCF | A | B |

522H

● <u>Admin</u> made changes –   09/Sep/19 2:38 PM

| Field | Original Value | New Value |
|---|---|---|
| TextCF | 1 | 2 |

Figure 5

SYSTEMS AND METHODS FOR MIGRATING DATA

FIELD

The present disclosure is directed to systems and methods for migrating data from an originating system to a destination system.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Issue tracking software for managing and tracking the issues is known. Each issue may have multiple data fields defining, for example, the type, priority, status, resolution and other attributes/items of information associated with the issue. Some issue tracking software applications allow users to define and associate custom fields with issues. This can be beneficial from a flexibility/adaptability perspective, however can also create complications if custom fields with the same name or other identifier are created.

BRIEF DESCRIPTION OF THE DRAWINGS

In the drawings:

FIG. 5 is an example user interface displaying a change history dataset of another data object to be migrated from an originating system to a destination system.

Figure 1:
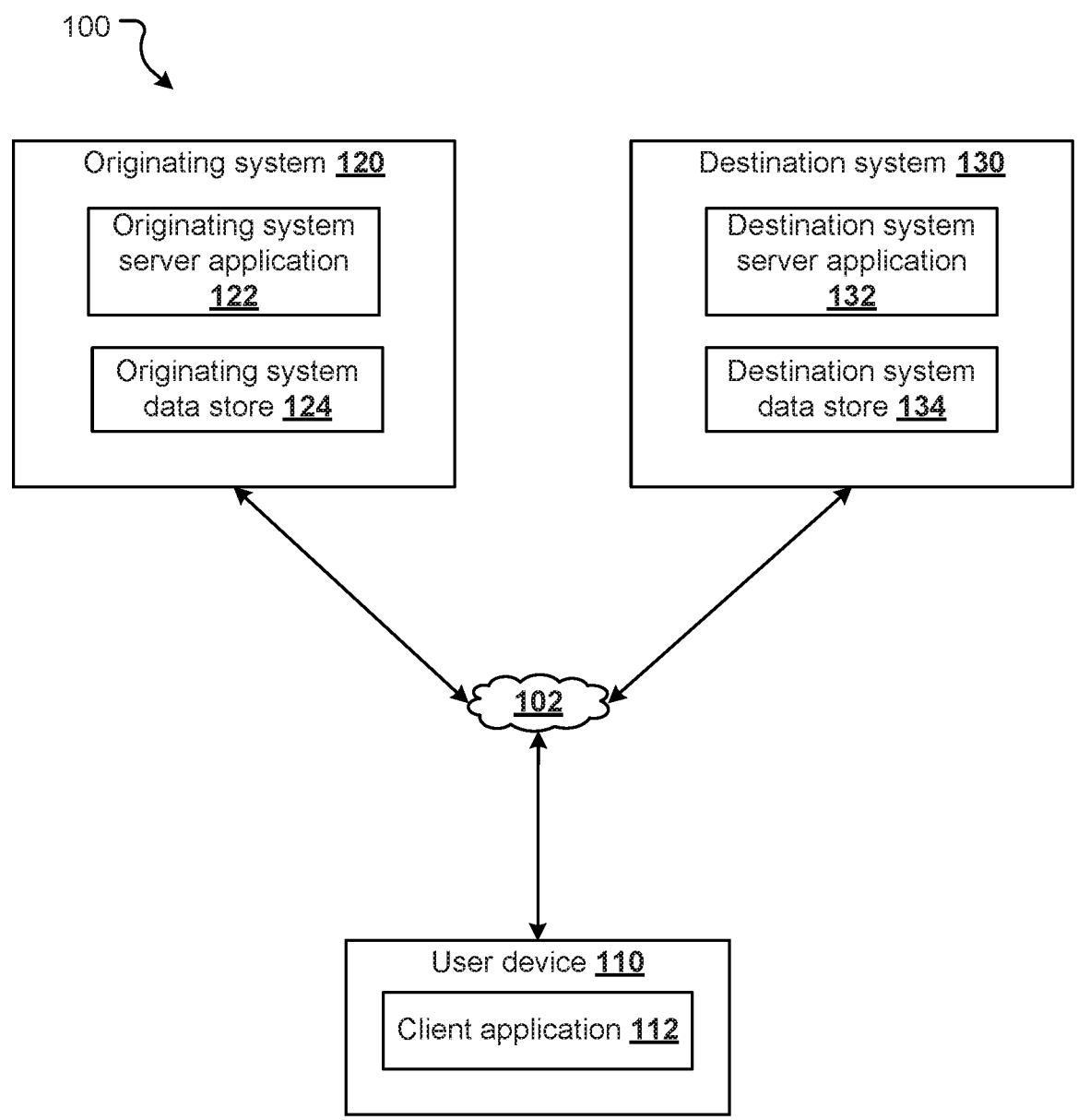
FIG. 1 is a block diagram of a networked environment according to aspects of the present disclosure.

While the disclosed embodiments are amenable to various modifications and alternative forms, specific embodiments are shown by way of example in the drawings and are described in detail. It should be understood, however, that the drawings and detailed description are not intended to limit the embodiments to the particular form disclosed. The intention is to cover all modifications, equivalents, and alternatives falling within the spirit and scope of the present disclosure as defined by the appended claims.

DETAILED DESCRIPTION

In the following description, for the purposes of explanation, numerous specific details are set forth in order to provide a thorough understanding of the present disclosure. It will be apparent, however, that features of the present disclosure may be practiced without these specific details. In some instances, well-known structures and devices are shown in block diagram form in order to avoid unnecessary obscuring.

The present disclosure relates to migrating data from an originating system to a destination system. Specifically, disclosure deals with migrating a data object's change history dataset.

Generally speaking, a data object is a dataset that includes data in respect of a set of associated data fields. An issue maintained by an issue tracking system is one example of a data object. In this case, the data object (issue) includes the data values for all populated data fields for that object (issue)—e.g. an issue name, an issue type, an issue status, an issue assignee and/or any other field values.

A change history dataset in the present context is a dataset recording changes that have been made to one or more data fields of a particular data object. A change history dataset includes one or more change event records, each change event record being in respect of a particular data field of the data object and recording a change to that data field (e.g. via a 'changed from' or 'original' value and a 'changed to' or 'new' value). The change history dataset for a given data object may itself be part of that data object's dataset. For example, an issue data object may include various fields (name, type, status, etc.) as well as a change history dataset field.

In the present disclosure, migrating a change history dataset involves processing the change history dataset to identify the particular object field that each individual change event record relates to and then associating the change event record (or data therefrom) with that field.

In the present disclosure, however, while a change event record in a given change history dataset includes an originating system data field identifier, it may be a non-unique identifier—i.e. the originating system data field identifier of a given change history record is not guaranteed to uniquely map to a single data field of the data object to which the change history dataset relates. As it will be appreciated, this makes migrating the change history dataset set problematic.

To illustrate this, consider a data object in the form of an issue (i.e. originating system data object) that is maintained by a server based issue tracking system (i.e. the originating system). For ease of reference, the acronym ITS will be used herein in place of "issue tracking system" below.

The issue may be an issue of a particular type, the issue type defining (e.g. via issue type metadata) what fields are available for that issue. For each originating system field the metadata may define a server data field identifier (i.e. originating system field identifier) and a current value. Examples of such data fields (and their identifiers) may include, for example, an issue type field, a priority field, a status field, and a resolution field. It will be appreciated that the server issue may include other server data fields.

The metadata of the server issue may also define a server change history dataset (i.e. originating change history dataset) that defines one or more server change event records (i.e. originating system change event records). Each server change event record is a record of a change made to the value of one of the server data fields for a given issue. Each server change event record may have: a field name (e.g. the server data field identifier); an original/previous value (indicating the value of the server data field before the change to which the record relates was made—i.e. the value the server data field was changed from); a new/updated value (indicating the value of the server data field after the change was made—i.e. the value the server data field was changed to); and a timestamp (indicating the date and time the change was made to the server data field).

In the present embodiment, the first record change event record for a given field is a record having an original value that is blank (or an alternative set value, e.g. a null value) and new value that is set to the first value assigned to the field (either automatically or by a user).

The server based ITS may allow a user to define multiple custom server data fields having a common server data field identifier—e.g. a common field name. In this case, the server change history dataset may have multiple server change event records for which the field name is the common server data field identifier. It will be appreciated that, for any server change event record where its field name is the common server data field identifier, it is unclear to which particular server data field having the common data field identifier the server change event record relates.

Situations may arise where the server change event records in the server change history dataset need to be associated with a specific data field. One example of this is where a user may wish to migrate data from the server based ITS (the originating system) to a cloud based ITS (i.e. a destination system). For each server issue, a corresponding cloud issue (i.e. destination data object) is created on the cloud based ITS and, for each server data field of the server issue, a corresponding destination system data field is created (in the present examples, the corresponding destination system data field having a unique destination system data field identifier. Accordingly, if a server issue has multiple server data fields having a common server data field identifier, the equivalent cloud data fields will have a unique cloud data field identifier.

Migrating the server change history dataset of a server issue from the server based ITS to the cloud based ITS generally involves reconstructing the server change history dataset on the cloud based ITS. This typically involves identifying which server data field each server change event record relates to based on the server data field identifier included in the field name of the server change event record and associating the server change event record with the identified server data field. Each server change event record is then migrated to the cloud based ITS and associated with the cloud data field of the cloud issue on the cloud based ITS that corresponds to the server data field the server change event records relates to.

The above method is appropriate where the server data fields of the server issue each have a unique server data field identifier, as each server change event record can be associated with one of the server data fields based on the server data field identifier included in the field name of the server change event record. However, this method may not be appropriate where the server issue has multiple server data fields having a common server data field identifier. This is because the field name of the server change event records only include a server data field identifier of one of the server data fields, which cannot be used to distinguish between server data fields having a common server data field identifier. Accordingly, in this case, for each server change event record where the field name is the common server data field identifier, it is unclear to which particular server data field having the common data field identifier the server change event record relates to based on the field name of the server change event record. As a consequence, for a server issue having multiple server data fields having a common server data field identifier, server change event records relating to those server data fields cannot be reconstructed on the cloud based ITS when migrating the server issue from the server based ITS to the cloud based ITS using the above method.

In the following, an overview of an example environment illustrating different systems involved in certain embodiments will be described, followed by a description of a computer system which can be configured in various ways to perform the embodiments/various features thereof as described herein. Following this, an example process of migrating originating change history datasets from a particular originating system (in the example a server based ITS) to a particular destination system (in the example a cloud based ITS) will be described.

FIG. 1 illustrates an example environment 100 in which embodiments and features of the present disclosure are implemented. Example environment 100 includes a communications network 102 which interconnects a user device 110, an originating system 120, and a destination system 130.

When executed by the user device 110 (e.g. by a processing unit such as 202 described below), the client 112 configures the user device 110 to provide client-side functionality. In the present examples, this involves communicating (using a communication interface such as 216 described below) with an originating system server application (e.g. originating system server application 122 running on originating system 120) and/or a destination system server application (e.g. destination system server application 132 running on destination system 130). Client 112 may be a dedicated application client that communicates with a server application using an application programming interface (API). Alternatively, client 112 may be a web browser (such as Chrome, Safari, Internet Explorer, Firefox, or an alternative web browser) which communicates with a web server using http/https protocols. While a single user device 110 has been depicted, environment 100 will typically include multiple user devices, each configured to interact with the ITS 120.

When executed by the user device 110 (e.g. by a processing unit such as 202 described below), the client 112 configures the user device 110 to provide data object migration functionality to allow data objects to be migrated from the originating system 120 to the destination system 130. This involves communicating with the originating system 120 (and, in particular, the originating system server application 122) or the destination system 130 (and, in particular, the destination system server application 132).

In the present example, while a single user device 110 has been depicted, environment 100 will typically include multiple user devices, each configured to interact with the originating system 120 and/or the destination system 130. User device 110 may be any form of computing device. Typically, user device 110 will be a personal computing device—e.g. a desktop computer, laptop computer, tablet computer, smart phone, or other computing device.

Originating system 120 includes an originating system server application 122 (originating application for short) and an originating system data store 124. The originating application 122 configures the originating system 120 to provide server side functionality. Generally speaking, this involves receiving and responding to requests from clients (e.g. client 112). Originating application 122 may be a web server (for interacting with web browser clients) or an application server (for interacting with dedicated application clients). While originating system 120 has been illustrated with a single originating application 122, it may provide multiple servers (e.g. one or more web servers and/or one or more application servers).

The originating system data store 124 is used for storing data related to the functions of the originating system 120 and, for example, one or more originating system data objects relating to the originating system 120.

Other functions provided by the originating system 120 will depend on the type of system. For example, where the originating system 120 is an issue tracking system, it may provide functionality such as tracking system operations, some of which are mentioned herein (e.g. the creation and management of issue types, workflows, issues, automations, and other issue tracking system operations).

In certain embodiments, originating system 120 is a scalable system. Depending on demand from clients (and/or other performance requirements), compute nodes can be provisioned/de-provisioned on demand. As an example, if there is high client demand additional originating applications 122 may be provisioned to cater for that demand. In this case, each functional component of the originating application 120 may involve one or several applications running on the same or separate computer systems, each application including one or more application programs, libraries, APIs or other software that implements the functionality described herein.

Destination system 130 includes a destination system server application 132 (destination application for short) and a destination system data store 134. The application 132 configures the destination system 130 to provide server side functionality. Generally speaking, this involves receiving and responding to requests from clients (e.g. client 112). Application 132 may be a web server (for interacting with web browser clients) or an application server (for interacting with dedicated application clients). While destination system 130 has been illustrated with a single application 132 it may provide multiple servers (e.g. one or more web servers and/or one or more application servers).

The destination system data store 134 is used for storing data related to the functions of the destination system 130 and, for example, one or more destination data objects relating to the destination system 130.

Other functions provided by the destination system 130 will depend on the type of system. For example, where the destination system 130 is an issue tracking system, it may provide functionality such as tracking system operations, some of which are mentioned herein (e.g. the creation and management of issue types, workflows, issues, automations, and other issue tracking system operations).

In certain embodiments, the destination system 130 is a scalable system. Depending on demand from clients (and/or other performance requirements), compute nodes can be provisioned/de-provisioned on demand. As an example, if there is high client demand additional destination applications 132 may be provisioned to cater for that demand. In this case, each functional component of the destination system 130 may involve one or several applications running on the same or separate computer systems, each application including one or more application programs, libraries, APIs or other software that implements the functionality described herein.

One example of an originating system 120 and a destination system 130 that can be configured to provide the functionality described herein is an issue tracking system.

Communications between the various systems in environment 100 are via the communications network 102. Communications network 102 may be a local area network, public network (e.g. the Internet), or a combination of both.

While environment 100 has been provided as an example, alternative system environments/architectures are possible.

The features and techniques described herein are implemented using one or more computer processing systems.

For example, in networked environment 100 described above, user device 110 is a computer processing system (for example, a personal computer, tablet/phone device, or other computer processing system). Similarly, the various functions performed by the originating system 120 and the destination system 130 are performed by one or more computer processing systems (e.g. server computers or other computer processing systems).

Figure 2:
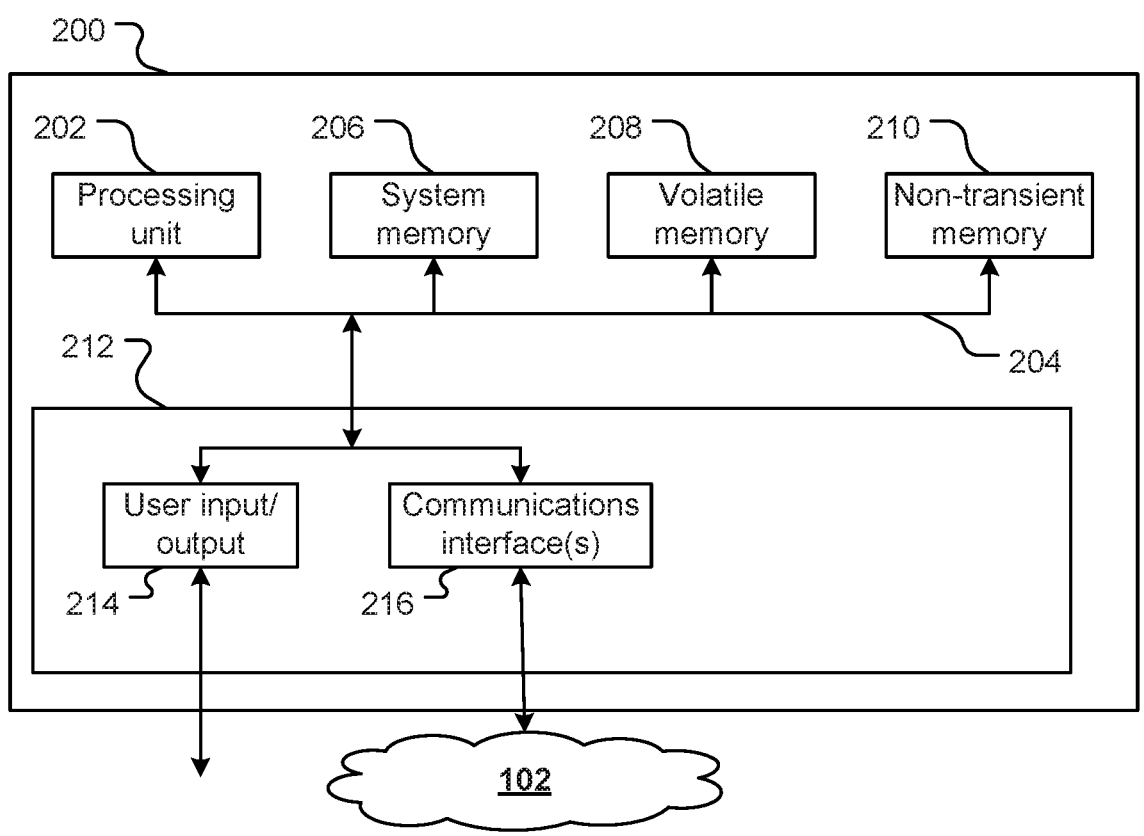
FIG. 2 is a block diagram of a computing system with which various embodiments of the present disclosure may be implemented.

FIG. 2 provides a block diagram of a computer processing system 200 configurable to perform various functions described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 (also referred to as a "processor" or "processors") is in data communication with a one or more machine or computer-readable storage (memory) devices which store instructions and/or data for controlling operation of the processing system 200. In this example system 200 includes a system memory 206 (e.g. a BRSS), volatile memory 208 (e.g. random access memory such as one or more DRAM modules), and non-volatile memory 210 (e.g. one or more hard disk or solid state drives). The system memory 206 may also be referred to herein as "computer-readable memory." The computer-readable memory may be used to store sequences of instructions that, when executed, cause the processing unit 202 to perform a series of operations or functions, in accordance with the description and examples provided herein.

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; SS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 also includes one or more communications interfaces 216 for communication with a network, such as network 102 of environment 100 (and/or a local network within the originating system 120 and/or the destination system 130). Via the communications interface(s) 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over interface such as 212.

Applications accessible to system 200 will typically include an operating system application such as Windows, macOS, iOS, Android, Unix, Linux, or other operating system.

System 200 also stores or has access to applications (e.g. computer readable instructions and/or data) which, when executed by the processing unit 202, configure system 200 to perform various computer-implemented processing operations described herein. For example, and referring to the networked environment of FIG. 1 above: user device 110 includes a client 112 which configures the user device 110 to perform various operations described herein, originating system 120 includes an originating application 122 which configures the originating system 120 to perform various operations described herein, and destination system 130 in includes an application 132 which configures the destination system 130 to perform various operations described herein.

Figure 3:
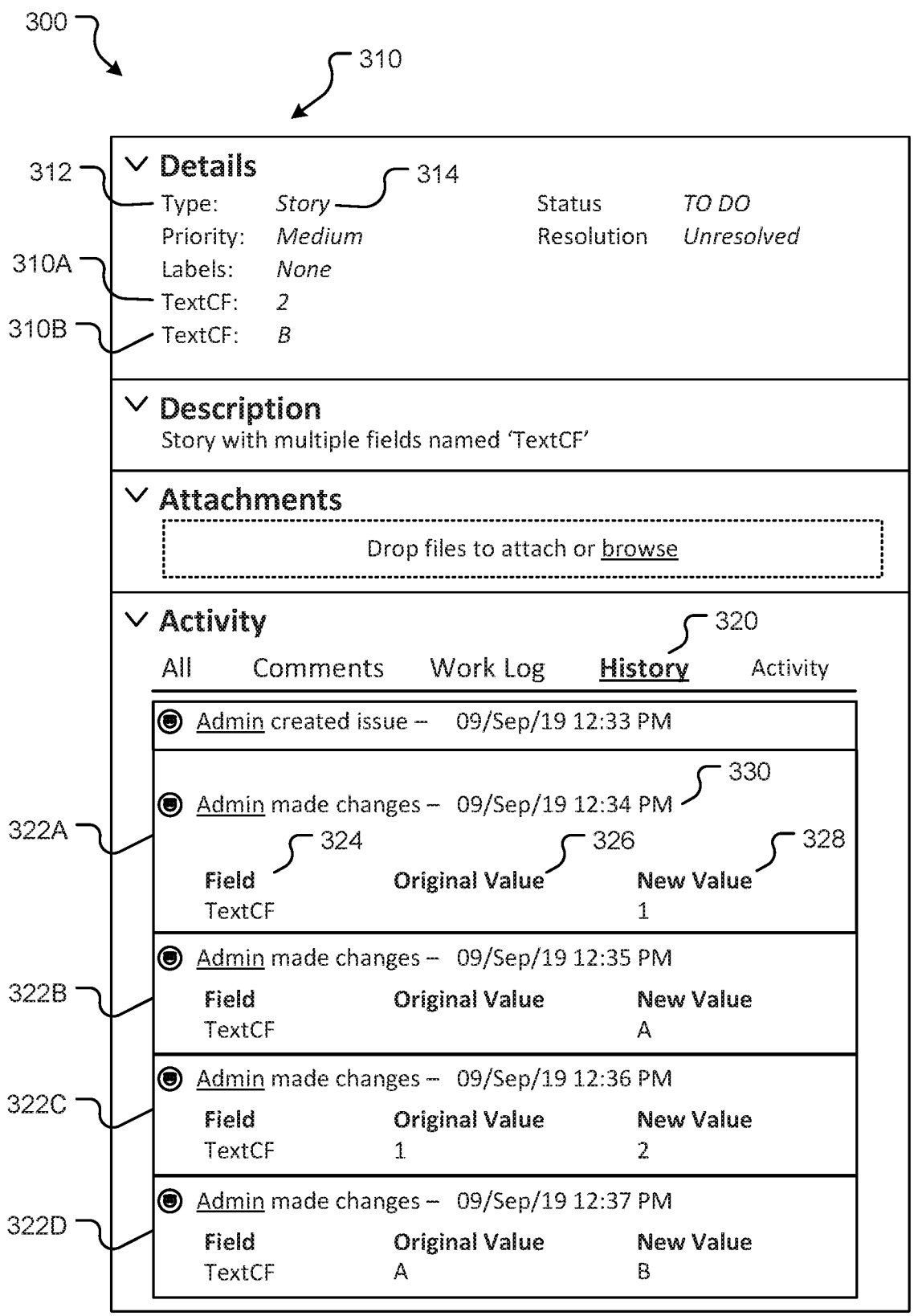
FIG. 3 is an example user interface displaying data in respect of a data object to be migrated from an originating system to a destination system.

The following provides a description of a method 400 of migrating originating change history datasets of originating system data objects from an originating system 120 to a destination system 130. To illustrate the embodiments, the specific example of migrating originating change history datasets in respect of issues from an originating ITS (i.e. originating system) to a destination ITS (i.e. destination system) will be described FIG. 3 shows an example user interface 300 displaying data in respect of an originating system data object—in this case an originating system issue managed by an originating ITS. User interface 300 is displayed on a display of user device 110 (under control of client application 112).

The originating system data object defines a plurality of originating system fields (indicated at 310), each having an originating system field identifier (indicated at 312) and corresponding current value (indicated at 314). In the present example these include fields with: field identifier type with current value story; field identifier priority with current value medium; field identifier status with current value TO DO; field identifier resolution with current value Unresolved; field identifier labels with current value None The plurality of originating system fields 310 also includes originating system fields 310a and 310b having a common originating system field identifier 312 of 'TextCF' and current values 314 of 'B' and '2', respectively. It will be appreciated that an originating system data object may include other originating system fields 310 and may include one or more custom originating system fields added by a user that may indicate a user defined attribute of the originating system data object. For example, the originating system fields 310a, 310b may be custom originating system fields that were added by one or more users (e.g. using client 112 on user device 110).

The originating system data object also has an originating system change history dataset which defines a plurality of change event records. The originating system change history dataset may be stored in any appropriate data structure (or set of related data structures). By way of example, the change history dataset may be stored in a table as follows:

| Record ID | Issue Id | Field ID | Original value | New Value | Timestamp | User ID |
|---|---|---|---|---|---|---|
| 01 | 300 | TextCF | Null | 1 | 09/Sep/10 12:34 PM | Admin |
| 02 | 300 | TextCF | Null | A | 09/Sep/10 12:35 PM | Admin |
| 03 | 300 | TextCF | 1 | 2 | 09/Sep/10 12:36 PM | Admin |
| 04 | 300 | TextCF | A | B | 09/Sep/10 12:37 PM | Admin |

In this example, each change event record includes: a change event record identifier (to uniquely identify the record); an issue identifier (identifying the issue that the record relates to); a Field ID (identifying the originating system field identifier that the record relates to); an original value (storing the original value of the field in question—i.e. the value the field was changed from); a new value (storing the new value of the field in question—i.e. the value the field was changed to); a timestamp (indicating the time/date of the change the record relates to); and a user identifier (indicating the user that made the change). Additional/alternative fields are possible.

In the example originating system change history dataset above, all four change event records have the common field identifier of 'TextCF'.

In the example of FIG. 3, data from the change history dataset is accessed via/displayed in a history tab 320. The history tab displays the plurality of originating system change event records 322 (in this example: record 322A corresponding to record 01 of the above table; record 322B corresponding to record 02 of the above table; record 322C corresponding to record 03 of the above table; record 322D corresponding to record 04 of the above table). In FIG. 3, each originating system change event record 322 displays the field name/identifier 324, the original value 326, the new value 328, and the timestamp 330.

Figure 4:
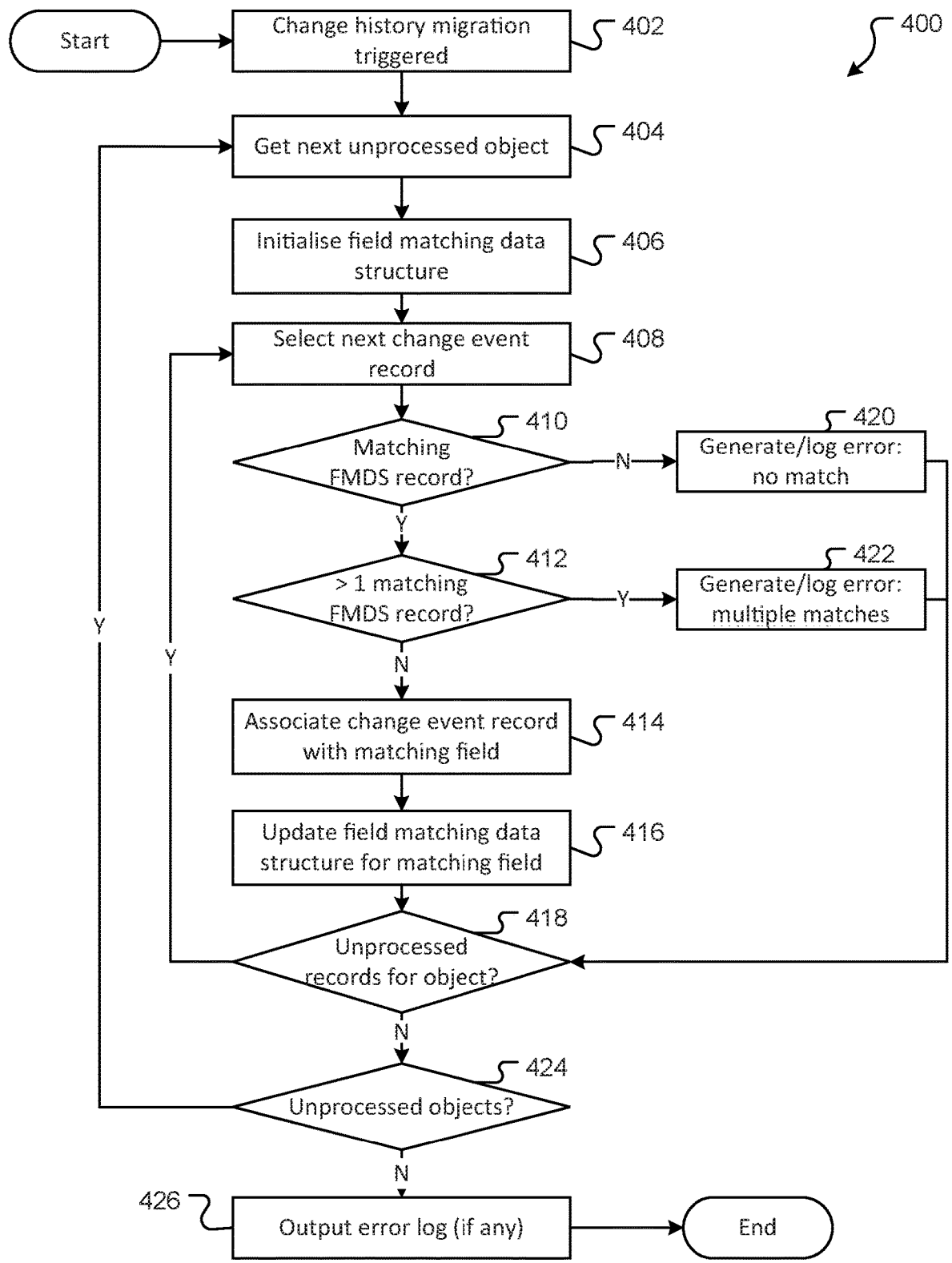
FIG. 4 provides a flowchart indicating operations involved in migrating objects from an originating system to a destination system according to an embodiment.

FIG. 4 is a flowchart of a method 400 of migrating data objects from an originating system 120 to a destination system 130. In one example, data objects being migrated are issue tracking system issues.

In the present embodiment, method 400 is implemented by the destination system server application 132 (referred to as application 132 in this section for short). Certain operations could be performed by other applications running on the destination system 130 or an alternative system (e.g. originating system 120 or even user device 110).

Broadly speaking, the method 400 operates to process issues being migrated from the originating system to the destination system in turn (though issues could be processed in parallel). For a given issue, each originating system change event record 322 of the originating system change history dataset 320 is processed in reverse chronological order. For a given change event record 322, the originating system field identifier 314 included in the field name 324 and the new/updated value 328 are taken into account in order to determine which originating system field 310 each originating system change event record 322 relates to.

At 402, migration of data objects from the originating system 120 to the destination system 130 is triggered. The migration could be triggered by a user (e.g. using client 112 on user device 110). Alternatively, the migration could automatically be triggered by the originating system server application 122 or the destination system server application 132.

When the migration is initially triggered, the application 132 may create a list of all the originating system data objects to be migrated from the originating system 120 to the destination system 130 and sets a status of each originating system data object in the list to 'unprocessed'.

At 404, application 132 selects the next unprocessed originating system data object. This may involve, for example, application 132 working through the list created at 402 based on the status of each originating system data object.

At 406, application 132 initializes a field matching data structure for the originating system data object selected at 404. In the present embodiment, the field matching data structure for a given originating system data object includes a field matching data structure record (also referred to as a field matching record for short) for each originating system field defined by the originating system data object in question. Each field matching record includes an originating system field identifier (which, as discussed, may be non-unique for the originating system data object in question), a destination system field identifier (e.g. a data field identifier that is unique for the originating system field in question), and a comparison variable (used to store a value of the originating system field in question).

On initialization of the field matching data structure, application 132 sets the comparison variable of a given originating system field to the current value of that originating system field as defined by the originating system data object. As described below, the comparison variables are updated as the originating system change history dataset is processed.

Any appropriate data structure may be used for the field matching data structure. For example, a table data structure may be used such as the below (which shows a partial field matching data structure as initialized for originating system data objects depicted in user interface 300 of FIG. 3).

| Originating system field identifier | Destination system field identifier | Comparison variable |
|---|---|---|
| Type | 001 | Story |
| Priority | 002 | Medium |
| Labels | 003 | None |
| Status | 004 | To do |
| Resolution | 005 | Unresolved |
| TextCF | 006 | 2 |
| TextCF | 007 | B |
| ... | ... | ... |

If not already performed, application 132 may also, at 406, create a destination system data object that corresponds to the originating system data object being processed and, for each originating system field of the originating system data object being processed, create a corresponding destination system field having a destination system field identifier that is unique for the destination system data object. Accordingly, if the originating system data object has multiple originating system fields having a common originating system field identifier, the corresponding destination system data object will have a unique destination system field identifier, meaning that none of the destination system data object of the destination system data object issue will have a common destination system field identifier. An example of this can be seen above, where the two originating system 'TextCF' fields are assigned destination system field identifiers of 006 and 007 respectively.

At 408, application 132 accesses the originating system change history dataset of the originating system data object being processed to retrieve the next originating system change event record. The originating system change history dataset is retrieved or received from the originating system 120 (either at the time operation 408 is performed or a previous time, for example, in a batch or other data object transfer process).

Application 132 is configured to process originating system change event records from the originating system change history dataset in reverse chronological order. The application 132 determines the reverse chronological order based on the time stamp of each originating system change event record. Accordingly, in the first processing loop for a given originating system data object, application 132 will select the latest originating system change event record. In subsequent processing loops for that originating system data object, application 132 will select originating system change event records in reverse chronological order.

In certain implementations, application 132 may be configured to initially set a status of each originating system change event record to 'unprocessed'. Once an originating system change event record has been processed, the application 132 may update the status of the processed originating system change event record from 'unprocessed' to 'processed'. Accordingly, at 408, the application 132 will process the latest originating system change event record (based on timestamp) that has a status of 'unprocessed'.

At 410, the application 132 performs a data field matching determination to determine if the originating system change event record being processed matches any of the field matching record(s). In the present embodiment, this involves determining if a field matching record has: an originating system field identifier that matches the originating system field identifier defined by the currently selected originating system change event record; and a comparison variable that matches the new (or updated) value defined by the currently selected originating system change event record.

If application 132 determines that at least one field matching record matches the originating system change event record being processed, processing proceeds to step 412. Conversely, if application 132 determines that no field matching records match the originating system change event record being processed, processing proceeds to step 420.

At 412, the application 132 determines if more than one field matching record matches the originating system change event record being processed. If not, processing proceeds to step 414. If so, processing proceeds to step 422.

At 414, the originating system change event record being processed matches a single field matching record (i.e. the matching record). Accordingly, at 414, application 132 associates the originating system change event record being processed with the unique field identifier of the matching field matching record (e.g. the relevant destination system field. In this case, the relevant destination system field is the destination system field listed in the matching record.

Application 132 may associate the originating system change event record with the destination system field in any appropriate manner. The originating system change event record may be associated with the relevant destination system field in any appropriate manner. For example, the destination system 130 may maintain object data in a relational database (maintained in the data store 134 of the destination system 130). In this case, the originating system change event record (or data based thereon) may be written to an appropriate change events table and associated with the relevant destination system field via the field identifier. By way of example, a destination system change events table may be as follows:

| Object identifier | Destination system field identifier | Field name (e.g. originating system field identifier) | Original value | New value | Timestamp |
|---|---|---|---|---|---|

In this example, the destination system change events table includes an object identifier (e.g. a unique identifier of the data object in question) and a destination system field identifier (e.g. a unique identifier of the data field in question). The destination system change events table further includes fields based on the originating system change event record—in this example (and with reference to the data object depicted in the user interface 300 of FIG. 3), these fields are the originating system's field name, an original value, a new value, and a timestamp.

In alternative embodiments, rather than actually associating at 414, a migration log entry is generated. In this case once all originating system data objects have been processed, the migration log is processed to actually migrate the originating system data object.

Once the originating system change event record has been associated with the relevant destination data field, processing proceeds to step 416.

At 416, the application 132 performs a field matching data structure update operation. The field matching data structure update involves updating the comparison variable of the matching field matching record to the original/previous value of the originating system change event record being processed. Once the field matching data structure update operation has been completed, processing proceeds to step 418.

Where originating system change event records are flagged as processed/unprocessed (to facilitate selection of the next originating system change event record at 408), application 132 also updates the status of the originating system change event record being processed from 'unprocessed' to 'processed'.

At 418, application 132 determines if there are any unprocessed originating system change event records for the originating system data object being processed. In the present example, application 132 determines if there are any unprocessed originating system change event records based on the status of each originating system change event record (i.e. processed or unprocessed). If there are no unprocessed originating system change event records for the current originating system data object, processing proceeds to step 424. If there are unprocessed originating system change event records, processing returns to step 408 to select and process the next change event record.

If, at 410, application 132 determines that none of the field matching records match with the originating system change event record being processed, application 132 will not be able to associate the originating system change event record being processed with an originating system data field. Accordingly, at 420, application 132 generates a 'no match identified' error and logs this error in an error log. A 'no match identified' error may arise, for example, where an originating system data object had an originating system field that was deleted after changes were made to this originating system field. As per the example below, a 'no match identified' error may also arise following the identification of multiple matching field matching records.

A 'no match identified' error indicates that the originating system change event record cannot be associated with any of the originating system fields of the originating system data object being processed and, therefore, the originating system change event record has not been migrated from the originating system 120 to the destination system 130.

The error log may be generated when the application 132 first determines that an error exists or at any other stage in the method 400. An error log may be created for each originating system data object being migrated from the originating system 120 to the destination system 130. Alternatively, a single error log may be created for all originating system data objects being migrated from the originating system 120 to the destination system 130.

Once the application 132 has generated and logged the 'no match identified' error, the application 132 updates the status of the originating system change event record being processed from 'unprocessed' to 'processed' and proceeds to 418.

If, at 412, the originating system change event record being processed matches with more than one field matching record, application 132 will not be able to determine which particular originating system field the originating system change event record relates to. Accordingly, at 422, application 132 generates a 'multiple matching data fields' error and logs this error in an error log. This error log may be the same error log discussed above in step 420 or a different error log.

A 'multiple matching data fields' error indicates that, during the field matching determination at 420, the application 132 identified multiple originating system fields to which the originating system change event record being processed could potentially relate and, therefore, that application 132 could not unambiguously determine a specific originating system field to associate the originating system change event record with. The 'multiple matching data fields' error will also indicate that, because it could not be determined which particular originating system field the originating system change event record being processed relates to, the originating system change event record has not been migrated from the originating system 120 to the destination system 130.

Once application 132 has generated and logged the 'multiple matching data fields' error, application 132 updates the status of the originating system change event record being processed from 'unprocessed' to 'processed' and proceeds to 418.

At 424, all change event records for the object currently being processed have been processed. Once all change event records for a given object have been processed, application 132 may update the status of that object from 'unprocessed' to 'processed'. Application 132 may also delete the field matching data structure created for that object.

At 424, application 132 determines if there are any unprocessed originating system data objects. If there are no unprocessed originating system data objects, processing proceeds to 426. If there are unprocessed originating system data objects, processing returns to step 404 to select the next unprocessed object and process it.

In embodiments where change event records are associated with matching fields at 414 (e.g. in a migration log) but data is not actually migrated, the actual data migration may be performed after determining at 424 that all objects have been processed.

As a result of the data migration (whether performed at 414 or following 424), the originating system change event records of each originating system data object will have been migrated to the destination system 130, with the exception of originating system change event records for which a 'no match identified' error or a 'multiple data field' error has been logged.

At 426, the application 132 may output a 'data object migration completed' notification to the client 112 on the user device 110 to notify the user that the migration of originating system data objects from the originating system 120 to the destination system 130 has been completed. At 426, the application 132 also outputs the error log(s) that includes any 'no match identified' errors logged at step 420 and any 'multiple matching data fields' error logged at step 422. If no errors were logged, the application 132 may not output error log(s) or may output an error log(s) indicating that there were no errors detected when migrating the originating system data objects from the originating system 120 to the destination system 130. The error log(s) may be issued together with the 'data object migration completed' notification or issued separately. After the 'data object migration completed' notification and error log(s) have been output and sent to the user, application 132 has completed the migration of originating system data objects from the originating system 120 to the destination system 130 and the application 132 has completed the method 400.

An example of migrating the originating system data object depicted in user interface 300 illustrated in FIG. 3 from an originating system (e.g. a server based ITS) to a destination system (e.g. a cloud based ITS) using method 400 will be described below. The originating system data object only includes originating system change event records 322 for the originating system fields 310a and 310b having the common originating system field identifier 314 of 'TextCF'.

At 402, migration of originating system data objects from the originating system 120 to the destination system 130 is triggered.

At 404, application 132 determines that the originating system data object is the next unprocessed originating system data object.

At 406, application 132 initializes a field matching data structure for the originating system data object. Below is an example of a field matching data structure in the form of a table data structure initialized by application 132 for the originating system data object.

| Originating system field identifier | Destination system field identifier | Comparison variable |
| --- | --- | --- |
| Type | 001 | Story |
| Priority | 002 | Medium |
| Labels | 003 | None |
| Status | 004 | To do |
| Resolution | 005 | Unresolved |
| TextCF | 006 | 2 |
| TextCF | 007 | B |

If not already performed, application 132 may also, at 406, create a destination system data object on the destination system 130 that corresponds to the originating system data object. For each originating system field 310 of the originating system data object, a corresponding destination system field having a unique destination system field identifier is created.

At 408, application 132 retrieves the next originating system change event record. In the first processing loop for the originating system data object, application 132 selects the fourth change event record 322 as it has the latest timestamp 330 (i.e. 09/Sep/19 12:37 PM).

At 410 and 412, application 132 determines that the field name 324 ('TextCF') and the new value 328 ('B') of the change event record 322 being processed match a single field matching record—i.e. the record with the destination system field with identifier '007' (i.e. the 7$^{th}$ row of the field matching data structure above).

At 414, application 132 associates the fourth originating system change event record 322 with the destination system field having identifier '007'. Application 132 may make this association, for example, in a destination system change events table as follows:

| Object identifier | Destination system field identifier | Field name (e.g. originating system field identifier) | Original value | New value | Timestamp |
| --- | --- | --- | --- | --- | --- |
| 300 | 007 | TextCF | A | B | 09/09/2019 12:37PM |

At 416, application 132 updates the relevant record (that with destination system field identifier of '007'). Specifically, application 132 updates the comparison variable of the record to 'A' ('A' being the 'original value' of the change event record being processed). For example:

| Originating system field identifier | Destination system field identifier | Comparison variable |
|---|---|---|
| Type | 001 | Story |
| Priority | 002 | Medium |
| Labels | 003 | None |
| Status | 004 | To do |
| Resolution | 005 | Unresolved |
| TextCF | 006 | 2 |
| TextCF | 007 | A |

Application 132 may then update the status of the fourth originating system change event record 322 from 'unprocessed' to 'processed'.

At 418, application 132 determines that the first, second, and third originating system change event records 322 are unprocessed and will return to step 408.

At 408, application 132 retrieves the next originating system change event record 322 (in this case the record with timestamp 09/Sep/19 12:36 PM).

At 410 and 412, application 132 determines there to be a single matching record in the field matching data structure (that with destination system field identifier '006').

At 414, application 132 associates the current change event record 322 with the destination system field listed in the matching field matching record. For example:

| Object identifier | Destination system field identifier | Field name (e.g. originating system field identifier) | Original value | New value | Timestamp |
|---|---|---|---|---|---|
| 300 | 007 | TextCF | A | B | 09/09/2019 12:37PM |
| 300 | 006 | TextCF | 1 | 2 | 09/09/2019 12:36PM |

At 416, application 132 updates the field matching data structure to set the comparison variable of the matching record (that with destination system field identifier '0006') to '1' (the 'original' value of the change event record being processed. For example:

| Originating system field identifier | Destination system field identifier | Comparison variable |
|---|---|---|
| Type | 001 | Story |
| Priority | 002 | Medium |
| Labels | 003 | None |
| Status | 004 | To do |
| Resolution | 005 | Unresolved |
| TextCF | 006 | 1 |
| TextCF | 007 | A |

At 418, application 132 determines that the first and second originating system change event records 322 are unprocessed and will return to step 408.

In the next processing loop, application 132 determines (at 410 and 412) that the change event record in question (with timestamp 09/SEP/19 12:35 PM) matches the single field matching record with destination system field identifier '007'. Accordingly, at 414 application 132 associates the change event record 322 with the destination system field having identifier '007'. For example:

| Object identifier | Destination system field identifier | Field name (e.g. originating system field identifier) | Original value | New value | Timestamp |
|---|---|---|---|---|---|
| 300 | 007 | TextCF | A | B | 09/09/2019 12:37PM |
| 300 | 006 | TextCF | 1 | 2 | 09/09/2019 12:36PM |
| 300 | 007 | TextCF |  | A | 09/09/2019 12:35PM |

At 416, application 132 updates the field matching data structure, in this case setting the 'comparison value' for the record with destination system field identifier '007' to blank. For example:

| Originating system field identifier | Destination system field identifier | Comparison variable |
|---|---|---|
| Type | 001 | Story |
| Priority | 002 | Medium |
| Labels | 003 | None |
| Status | 004 | To do |
| Resolution | 005 | Unresolved |
| TextCF | 006 | 1 |
| TextCF | 007 |  |

At 418, application 132 determines that the first originating system change event record 322 is unprocessed and returns to step 408.

In the next processing loop, application 132 determines (at 410 and 412) that the change event record in question (with timestamp '09/SEP/19 12:34 PM') matches a single field matching record (the record having destination system field identifier '006'. Accordingly, at 414 application 132 associates the change event record 322 with the destination system field having identifier '006'. For example:

| Object identifier | Destination system field identifier | Field name (e.g. originating system field identifier) | Original value | New value | Timestamp |
|---|---|---|---|---|---|
| 300 | 007 | TextCF | A | B | 09/09/2019 12:37PM |
| 300 | 006 | TextCF | 1 | 2 | 09/09/2019 12:36PM |
| 300 | 007 | TextCF |  | A | 09/09/2019 12:35PM |
| 300 | 006 | TextCF |  | 1 | 09/092019 12:35PM |

At 416, application 132 updates the field matching data structure, in this case setting the 'comparison value' for the record with destination system field identifier '006' to blank. For example:

| Originating system field identifier | Destination system field identifier | Comparison variable |
|---|---|---|
| Type | 001 | Story |
| Priority | 002 | Medium |
| Labels | 003 | None |
| Status | 004 | To do |
| Resolution | 005 | Unresolved |

-continued

| Originating system field identifier | Destination system field identifier | Comparison variable |
|---|---|---|
| TextCF | 006 | |
| TextCF | 007 | |

At 418, application 132 determines that there are no unprocessed originating system change event records 322 for the originating system data object and proceeds to step 424.

At step 424, application 132 (for the purpose of the present example) determines there are no unprocessed originating system data objects, and at 426 outputs an "object data migration completed' notification to the client 112 on the user device 110 to notify the user that the migration of originating system data objects from the originating system 120 to the destination system 130 has been completed.

To further illustrate the operation of method 400, consider an alternative example change history dataset such as:

| Record ID | Issue Id | Field ID | Original value | New Value | Timestamp | User ID |
|---|---|---|---|---|---|---|
| 01 | 500 | TextCF | | 0 | 09/Sep/10 2:31 PM | Admin |
| 02 | 500 | TextCF | | — | 09/Sep/10 2:32 PM | Admin |
| 03 | 500 | TextCF | — | Common | 09/Sep/10 2:33 PM | Admin |
| 04 | 500 | TextCF | 0 | Common | 09/Sep/10 2:34 PM | Admin |
| 05 | 500 | TextCF | Common | A | 09/Sep/10 2:35 PM | Admin |
| 06 | 500 | TextCF | Common | 1 | 09/Sep/10 2:36 PM | Admin |
| 07 | 500 | TextCF | A | B | 09/Sep/10 2:37 PM | Admin |
| 08 | 500 | TextCF | 1 | 2 | 09/Sep/10 2:38 PM | Admin |

FIG. 5 depicts a user interface 500 displaying data 520 from the above change history dataset above. In particular, the change history dataset includes eight change event records 522A to 522H corresponding to record IDs 01 to 08 of the above table respectively.

Processing the change history dataset depicted at 520 according to method 400 results in errors being generated. Processing the first four change event records 522H to 522E (in reverse chronological order, that is records having timestamps '9/Sep/19 2:38 PM', '9/Sep/19 2:37 PM', '9/Sep/19 2:36 PM', and '9/Sep/19 2:35 PM' respectively) leads to a field matching data structure as follows:

| Originating system field identifier | Destination system field identifier | Comparison variable |
|---|---|---|
| . . . | . . . | . . . |
| TextCF | 006 | Common |
| TextCF | 007 | Common |

In the next processing loop, the change event record with timestamp '9/Sep/19 2:34 PM' is selected for processing at 408.

At 410, application 132 determines there is a matching record in the field matching record, however at 412 determines there are two such records. Specifically, the field matching records with destination system field identifiers '006' and '007' both match the change event record being processed, as both have a matching originating system field identifier ('TextCF') and both have a matching comparison value ('Common').

Accordingly, at 422 application 132 generates a 'multiple matching data fields' error and logs this error in an error log.

The 'multiple matching data fields' error indicates that the fourth originating system change event record 522 could potentially relate to the originating system field 310a or originating system field 310b. The 'multiple matching data fields' error will also indicate that the relevant fourth originating system change event record 522 was not migrated from the originating system 120 to the destination system 130.

In the next processing loop application 312 selects the change event record with timestamp '9/Sep/19 2:33 PM' for processing. In this case application 132 again determines (at 412) that the change event record in question matches multiple field matching records and (at 422) generates a 'multiple matching data fields' error.

In the next processing loop application 312 selects the change event record with timestamp '9/Sep/19 2:32 PM' for processing. In this case application 132 determines (at 410) that the change event record does not match any record in the field matching data structure. Application 132 therefore generates a 'no match identified' error at 420 and logs this error in an error log.

In the next processing loop application 312 selects the change event record with timestamp '9/Sep/19 2:31 PM' for processing. In this case application 132 determines (at 410) that the change event record does not match any record in the field matching data structure. Application 132 therefore generates a 'no match identified' error at 420 and logs this error in an error log.

All change event records are then processed. At 426, application 132 outputs the 'object data migration completed' notification to the client 112 on the user device 110 to notify the user that the migration of originating system data objects from the originating system 120 to the destination system 130 has been completed. Application 132 also outputs the 'no match identified' errors logged for the first and second originating system change event records 522 and the 'multiple matching data fields' error logged for the third and fourth originating system change event records 522. The error log(s) may be issued together with the 'data object migration completed' notification or issued separately to the client 112 on the user device 110. After the 'data object migration completed' notification and error log(s) have been output and sent to the user, the application 132 has completed the migration of originating system data objects from the originating system 120 to the destination system 130 and has completed the method 400.

In method 400 described, the determination of matching field matching records is based on an originating system field identifier and a comparison variable value. In alternative embodiments, matching may also take into account a data type of the field in question and the comparison value. For example, the field matching data structure may take a form as follows:

| Originating system field identifier | Destination system field identifier | Comparison variable | Data type |
| --- | --- | --- | --- |

In this case, determining that a record of the field matching data structure matches a change event record may require a matching originating system field identifier, a matching comparison value, and a matching data type. Specifically, during the field matching determination at step 410, the application 132 may determine if the field name, new/updated value, and data type of the originating system change event record being processed matches with the originating system field identifier, comparison variable, and data type of any of the field matching records.

In certain implementations, originating system data field values may be stored in a different format to the format of the original/new values in the change event records. As one example, a field value may be an array (e.g. [2, 4, 6, 8]) while the corresponding original/new values in the change event record may be a string (e.g. "2, 4, 6, 8"). To account for this, application 132 may be configured to perform data normalization operations so the formats of the comparison variable values stored in the field matching data structure match the formats of the original and new values as stored in the change event records. The particular data normalization operation for a given change event record (and/or comparison variable value) may be determined based on the originating system field identifier (and/or data type). For example, application 132 may be configured to convert the current value of each originating system data field into the same format as the original/new values of the originating system change event records before the field matching data structure is first created. Alternatively, application 132 may perform a data normalization step to convert the current value of each originating system field and/or the original/new values of the originating system change event records into a same, common format, before the field matching data structure is first created.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart operation could potentially be performed in various different ways and by various different systems or applications. Furthermore, it may be possible for a given flowchart operation to be divided into multiple operations and/or multiple flowchart operations to be combined into a single operation. Furthermore, in some instances the order of the steps may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer implemented method comprising:
   accessing a change history dataset in respect of an originating system data object, wherein:
   the originating system data object defines a plurality of originating system data object fields, each originating system data object field being associated with an originating system field identifier and a current value, and wherein at least two originating system data object fields have a non-unique originating system field identifier; and
   the change history dataset includes a plurality of change event records, each change event record associated with an originating system field identifier, an original value, a new value, and a timestamp;
   maintaining a set of field matching records, each field matching record corresponds to one of the originating system data object fields, and each field matching record includes:
   the originating system field identifier of the corresponding originating system data object field;
   a comparison variable for the corresponding originating system data object field, the comparison variable based on the current value of the corresponding originating system data object field, the current value corresponds to a respective new value in the associated change event record for the originating system field identifier; and
   a unique field identifier;
   selecting a change event record for processing; and
   processing the selected change event record by:
   determining if the selected change event record matches any of the field matching records, wherein determining that the selected change event record matches a particular field matching record comprises:
   determining that the originating system field identifier associated with the selected change event record matches the originating system field identifier of the particular field matching record; and
   determining that the new value associated with the selected change event record matches the comparison variable of the particular field matching record; and
   in response to determining that the selected change event record matches a single field matching record, associating the selected change event record of the originating system data object field with the unique field identifier of the single field matching record in a data store configured to store a destination system data object corresponding to the originating system data object, the single field matching record corresponds to a destination system data object field of a plurality of destination system data object fields of the destination system data object.

2. The computer implemented method of claim 1, wherein selecting the change event record initially comprises selecting a first change event record, the first change event record being a change event record associated with the most recent timestamp.

3. The computer implemented method of claim 1, wherein, in response to determining that the selected change event record matches the single field matching record, the method further comprises:
   updating the comparison variable of the single field matching record by recording the original value associated with the selected change event record as the comparison variable of the single field matching record.

4. The computer implemented method of claim 1, wherein, in response to determining that the selected change event record matches more than one field matching record, the method further comprises generating a multiple matching data field error indicating that the selected change event record cannot be associated with a unique field identifier.

5. The computer implemented method of claim 1, wherein, in response to determining that the given change event record does not match any field matching record, the method further comprises generating a no matching data field error indicating that the selected change event record cannot be associated with a unique field identifier.

6. The computer implemented method of claim 1, wherein determining that the selected change event record matches a particular field matching record further comprises determining that a data type associated with the selected change event record matches a data type associated the particular field matching record.

7. The computer implemented method of claim 1, wherein determining that the new value associated with the selected change event record matches the comparison variable of the particular field matching record comprises performing a data normalization operation so the new value associated with the selected change event record and the comparison variable of the particular field matching record are in a common format.

8. The computer implemented method of claim 1, wherein:
    each destination system data object field corresponding to an originating system data object field has a unique destination system field identifier; and
    the unique field identifier of a given field matching record is the unique destination system field identifier of the destination system field corresponding to the originating system field identifier that the given field matching record is associated with.

9. The computer implemented method of claim 1, wherein the originating system data object is an issue maintained by an issue tracking system.

10. The computer implemented method of claim 1, wherein, in response to determining that the selected change event record matches a single field matching record, the method further comprises:
    selecting a next change event record for processing, the next change event record being a change event record with the next most recent timestamp compared to the timestamp of the currently selected change event record; and
    processing the next change event record.

11. A computer processing system comprising:
    one or more processors;
    computer-readable memory storing sequences of instructions, which when executed by the one or more processors, cause the one or more processors to:
        access, by the one or more processors, a change history dataset in respect of an originating system data object, wherein:
            the originating system data object defines a plurality of originating system data object fields, each originating system data object field being associated with an originating system field identifier and a current value, and wherein at least two originating system data object fields have a non-unique originating system field identifier; and
            the change history dataset includes a plurality of change event records, each change event record associated with an originating system field identifier, an original value, a new value, and a timestamp;
        maintain a set of field matching records, each field matching record corresponds to one of the originating system data object fields, and each field matching record includes:
            the originating system field identifier of the corresponding originating system data object field;
            a comparison variable for the corresponding originating system data object field, the comparison variable based on the current value of the corresponding originating system data object field, the current value corresponds to a respective new value in the associated change event record for the originating system field identifier; and
            a unique field identifier;
        select a change event record for processing; and
        process the selected change event record by:
            determining if the selected change event record matches any of the field matching records, wherein determining that the selected change event record matches a particular field matching record comprises:
                determining that the originating system field identifier associated with the selected change event record matches the originating system field identifier of the particular field matching record; and
                determining that the new value associated with the selected change event record matches the comparison variable of the particular field matching record; and
            in response to determining that the selected change event record matches a single field matching record, associating, in a data store accessible to the computer processing system, the selected change event record of the originating system data object field with the unique field identifier of the single field matching record configured to store a destination system data object corresponding to the originating system data object, the single field matching record corresponds to a destination system data object field of a plurality of destination system data object fields of the destination system data object.

12. The computer processing system of claim 11, wherein selecting the change event record initially comprises selecting a first change event record, the first change event record being a change event record associated with the most recent timestamp.

13. The computer processing system of claim 11, wherein, in response to determining that the selected change event record matches the single field matching record, execution of the sequences of instructions further cause the one or more processors to:
    update the comparison variable of the single field matching record by recording the original value associated with the selected change event record as the comparison variable of the single field matching record.

14. The computer processing system of claim 11, wherein, in response to determining that the selected change event record matches more than one field matching record, execution of the sequences of instructions further cause the one or more processors to generate a multiple matching data field error indicating that the selected change event record cannot be associated with a unique field identifier.

15. The computer processing system of claim 11, wherein, in response to determining that the given change event record does not match any field matching record, execution of the sequences of instructions further cause the one or more processors to generate a no matching data field error indicating that the selected change event record cannot be associated with a unique field identifier.

16. The computer processing system of claim 11, wherein determining that the selected change event record matches a particular field matching record further comprises determining that a data type associated with the selected change event record matches a data type associated the particular field matching record.

17. The computer processing system of claim 11, wherein determining that the new value associated with the selected change event record matches the comparison variable of the particular field matching record comprises performing a data normalization operation so the new value associated with the selected change event record and the comparison variable of the particular field matching record are in a common format.

18. The computer processing system of claim 11, wherein:
each destination system data object field corresponding to an originating system data object field has a unique destination system field identifier; and
the unique field identifier of a given field matching record is the unique destination system field identifier of the destination system field corresponding to the originating system field identifier that the given field matching record is associated with.

19. The computer processing system of claim 11, wherein the originating system data object is an issue maintained by an issue tracking system.

20. The computer processing system of claim 11, wherein in response to determining that the selected change event record matches a single field matching record, execution of the sequences of instructions further cause the one or more processors to:
select a next change event record for processing, the next change event record being a change event record with the next most recent timestamp compared to the timestamp of the currently selected change event record; and
process the next change event record.

* * * * *